May 2, 1933.  J. PLESCH  1,906,806
OSCILLOGRAPH
Filed June 26, 1929  4 Sheets-Sheet 1
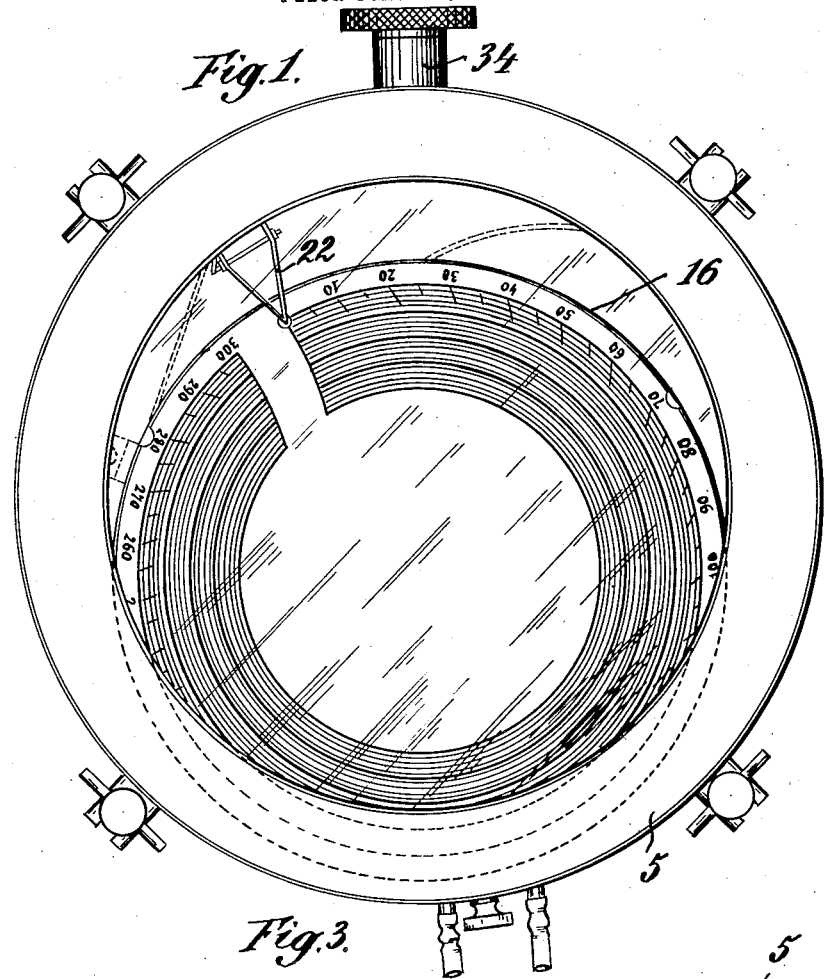
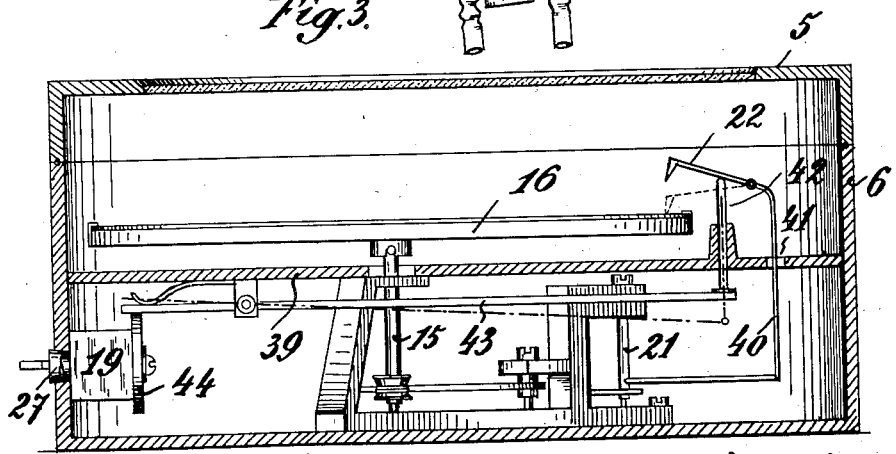
Inventor
Johann Plesch
By Knight Bros.
attorneys May 2, 1933. J. PLESCH 1,906,806
OSCILLOGRAPH
Filed June 26, 1929 4 Sheets-Sheet 2
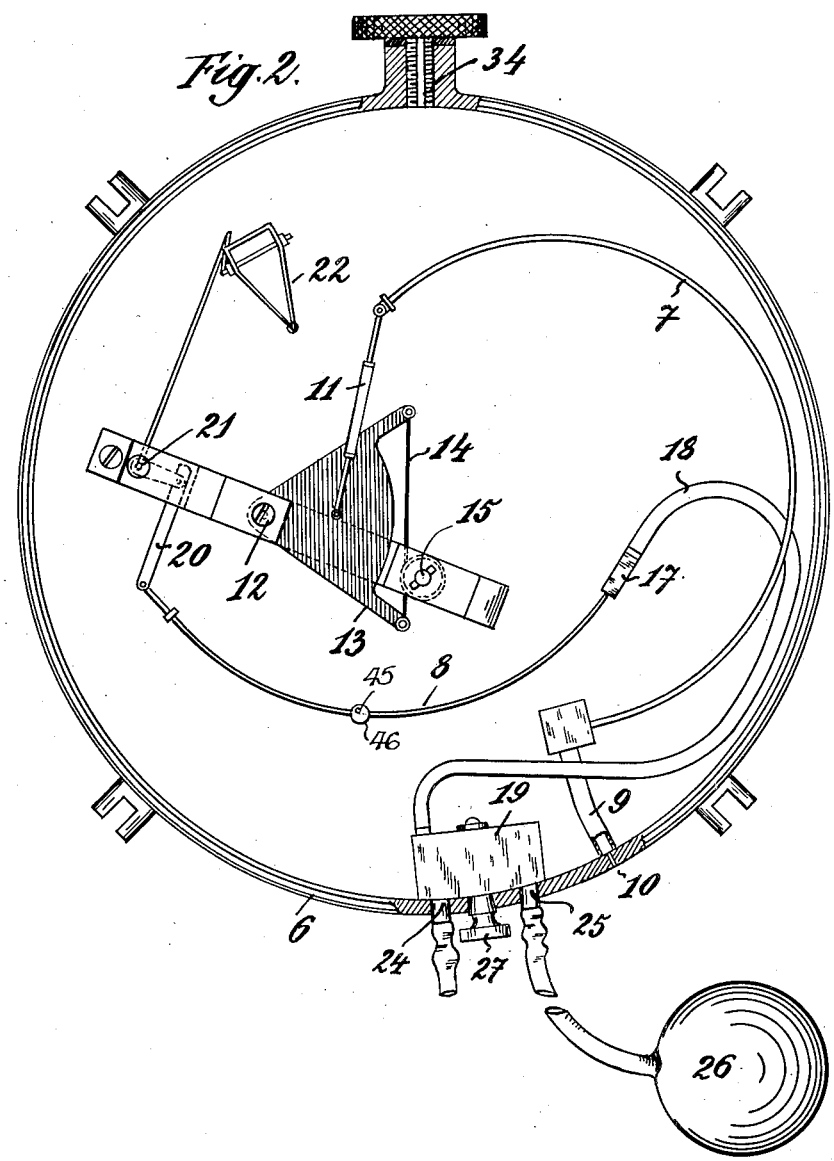

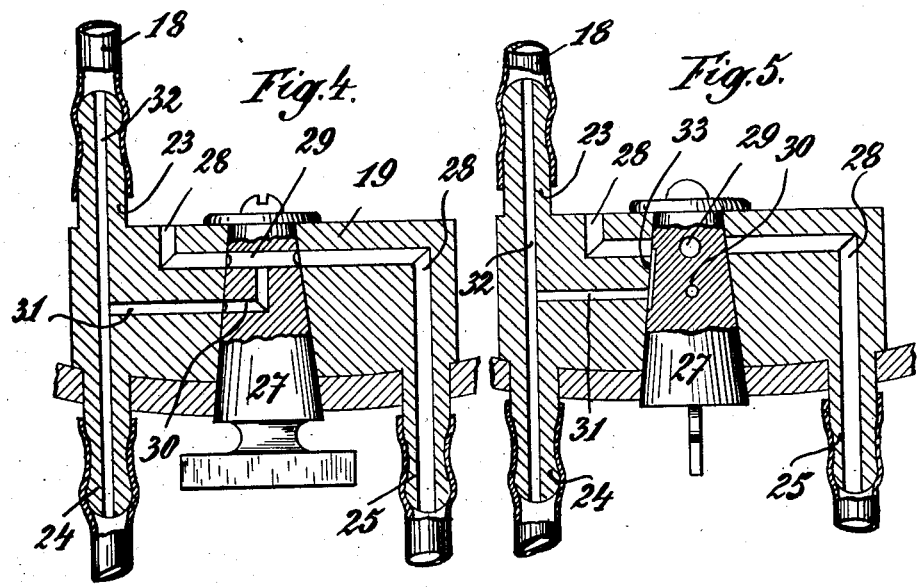

May 2, 1933. J. PLESCH 1,906,806
OSCILLOGRAPH
Filed June 26, 1929 4 Sheets-Sheet 4
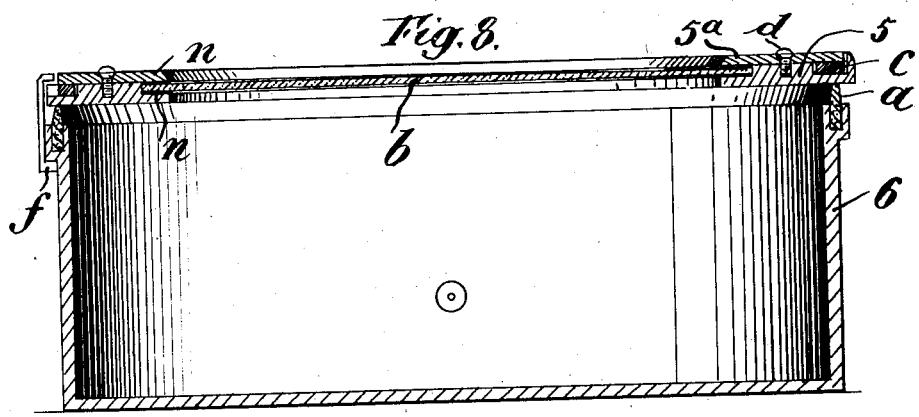
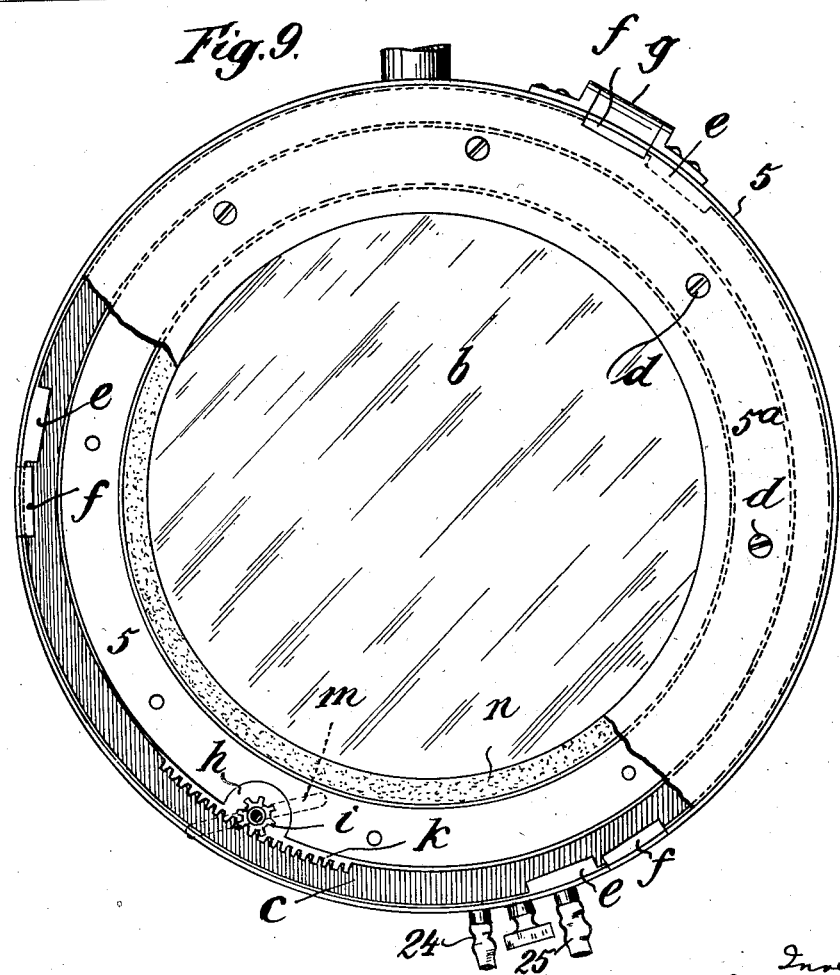

Patented May 2, 1933

1,906,806

UNITED STATES PATENT OFFICE

JOHANN PLESCH, OF BERLIN, GERMANY

OSCILLOGRAPH

Application filed June 26, 1929, Serial No 373,925, and in Germany September 19, 1928.

This invention relates to oscillographs, more particularly those intended to record pulsations. In known oscillographs of this type it was hitherto impossible, owing to the recording pen being directly coupled with the pneumatic case or pipe to record the result concentrically on a recording dial or to trace a curve on a drum along a straight base line, since the deformation of the case or pipe varies according to the degree of tension and, upon the tension decreasing, a bow is traced on the recording sheet, so that the oscillations arising in the meantime can be recorded only by stepped or spiral lines. This disadvantage might be eliminated most easily by indirectly coupling the recording pen with the pneumatic pipe, this being obtained, however, at the cost of the reliability in service, the practical use and the exactness of the records of the oscillograph.

An indirectly coupled recording pen permits the recording of only the individual beats of the pulse, but not the entire course of pulsation, while the curves obtained by means of a directly coupled recording pen record both the raising and lowering of the pulsation, that means the correct course of the entire pulse range is recorded by means of a directly coupled pen.

In order to obtain a most exact possible determination of the blood pressure with a simultaneous record of the pulse curve, several new arrangements are provided according to the invention in oscillographs. When two manometers are put under pressure simultaneously and the increase of pressure is transmitted intermittently to one of these through a capillary hole and to the other manometer through a wider one, the latter manometer will react upon the air blow sooner than that having the capillary hole. If these two manometers are rigidly connected to one another, the manometer having the wider hole will pull the other toward the stop side. As soon, however, as a balance exists between the two pressures, both manometers will return to a medium position. This phenomenon is utilized according to the present invention. When a manometer pipe is put under equal external and internal pressure, no matter how light, it undergoes, of course, no deformation. On this account the pipe should be made of any highly sensitive material in order that it will very promptly react upon the slightest variation of pressure. The deformations of a pipe of such design do not come into consideration for the manometric pressure in blood pressure tests, while such pipe very promptly records the finest variations of the pulse pressure. Due to its remaining in position of rest, this pipe if rigidly connected to the recording pen, makes possible a concentric record despite the increase of the surrounding pressure. As it is necessary in blood pressure tests to record at the same time the pulse waves belonging to the manometric pressure, I provide an arrangement by which the mechanism that records the pulse is set into connection of equal sign with the mechanism that records the manometric pressure. To this end both mechanisms are so arranged in an air-tightly closed casing that the interior of the pipe indicating the manometric pressure communicates with the outer air, and when deformed by the pressure in the casing rising, is capable of turning a gaged dial through the intermediary of suitable transmitting members. This dial then indicates the pressure just prevailing in the air-tightly closed casing. The pressure prevailing within the other manometer pipe is equalized to the pressure prevailing in the casing through a capillary bore. On the other hand, this latter pipe which indicates the pulse pressure, by throwing over a lever can be brought to wide communication with a rubber bandage or pelotte which when inflated or pressed on is able to compress the artery up to complete closure.

This principle can be carried out practically in different ways which permit the recording of the exact blood pressure curves of any individual, such as grown-up persons having high or low blood pressure, children, animals having very high blood pressure, and so on. To this end I provide levers serving to set different capillary passage areas, to equalize, as desired the pressure in the manometer pipe. Furthermore, the apparatus must be so protected that its delicate mechanism cannot be injured inadvertently or accidentally. Finally, the course of the pressure has to be so regulated at will by means of suitable valves that the prescribed curve of the pulse pressure fulfills the required conditions in the most satisfying manner.

In order that my invention can be more readily understood, an embodiment of the same is illustrated by way of example in the accompanying drawings in which Figure 1 is a top view of my new oscillograph with the casing closed, Figure 2 is a similar view, the cover, diagram dial and protection glass being removed, Figure 3 is a cross section of the apparatus, Figures 4 to 7 are details, partly on enlarged scale, Figure 8 is a section through the casing of the apparatus and illustrates a particularly advantageous air-tight obturation thereof, and Figure 9 is a corresponding top view.

Referring to these drawings, 7 and 8, Figure 2, are two Bourdon pipes which are arranged on the bottom of the casing 6. The pipe 8 can be adjusted by a screw 17 so that the recording pen 22 can be set to the desired point. The other pipe 7 is connected to the wall of casing 6 by means of a hose or pipe 9 and communicates with the outer air through a bore 10 in this wall. Through the intermediary of a rod 11 the free end of pipe 7 is hingedly connected to a fork 13 fulcrumed at 12, the rod 11 enabling the setting of pipe 7 to zero. The fork 13 carries an adjustable cord 14 wound about the shaft 15, Figures 2 and 3, which latter has mounted on it the diagram dial 16. Upon pipe 7 straightening, the dial 16 thus is turned nearly a full revolution. The pipe 8 which has a very thin wall, is connected by a hose or pipe 18 to a controlling valve 19. By a lever 20 the free end of the pipe 18 is in direct hinged connection to the recording pen 22 which is fulcrumed at 21. The controlling valve is designed as a multiple way cock, Figures 4 and 5, and possesses three connecting sockets 23, 24, 25, socket 23 being connected to the hose 18 of pipe 8, while socket 24 is connected to the bandage and socket 25 to the inflating ball 26. When the cock 27 assumes the position illustrated in Figure 4 and the ball 26 is pressed after the bandage has been applied, then the interior of the casing 6 is set under pressure through the bore 28 and the bore 29 of cock 27 until the dial 16 has executed a rotation the amplitude of which is greater than required for the probable blood pressure of the person to be examined. This rotation can be read off in the usual manner from a diagram sheet put on the dial 16. This pressure is transmitted simultaneously through the bore 30 of cock 27 and the passages 31 and 32 to the interior of pipe 8 and to the bandage applied to the body by which bandage an artery is shut off. When this takes place, pipe 8 remains in state of rest since it is under equal pressure inside and outside. Upon turning cock 27 from the position shown in Figure 4 for instance 90 degrees into the position illustrated in Figure 5, the ball 26 is shut off from the entire apparatus, but the bore 28 that leads to the casing 6 is connected through a small passage 33 of cock 27 to the passages 32, 31 so that casing 6 communicates with the interior of pipe 8 and the bandage. Now, when an outlet valve 34, Figure 2, mounted on the casing 6 is opened so that the pressure prevailing therein gradually decreases, pipe 7 begins receding and slowly turns back the dial 16. At the same time the pressure in pipe 8 decreases in the same measure so that this pipe and the bandage further remain in position of rest. When the pressure in the casing 6, pipe 8 and bandage has been reduced to such an extent that the pulse begins acting, then due to the artery swelling a pressure is exerted upon the bandage and the momentary increased pressure even when ever so slight is transmitted to pipe 8, because the air expelled by the pulsations cannot escape at once through the small passage 33. Pipe 8 thus takes part in the beats of the pulse which beats are recorded by pen 22.

In place of providing the small passage 33 on the cock 27, there may be arranged on any place of the pipe 8 in the shape of a capillary bore terminating in an opening 45 the passage area of which bore may be made adjustable by a member 46 in any well known manner to obtain different amplitudes of beats which could be necessary, that means to either damp them if too great (with persons suffering from the kidneys and the like) or to enlarge them (with children, convalescents and the like). Under certain circumstances two capillary passages may be provided, that is one in pipe 8 and the other in cock 27. If the connecting member 18 is a metal pipe, the capillary passage can be provided therein.

It will be evident that the air under pressure in the casing 6 must not be blown off more quickly than the balance takes place between the outer and inner pressure acting on pipe 8. This however depends upon the passage area of the capillary passage. To correspond to these fine differences the outlet valve 34 must be designed so as to be very finely regulatable. Figure 7 shows a modification of this valve on enlarged scale and in longitudinal section. In this valve is arranged a spring 38 which exerts a constant pressure upon the tapering valve stem 35 and thus permanently keeps closed the outlet opening. By differently tightening nut 37 stem 35 is urged back to different extent whereby a very finely adjustable passage through the valve is obtained. As the curves traced represent curves of volume, the described mechanism is the first to determine the volumes of the individual beats of the pulse as evidenced in the brachial artery, as is explained hereinafter. To this end the apparatus is gaged under a pressure which represents the optimum for the tests, by introducing a known volume of air in the mechanism, this being made best by means of a graduated syringe connected in parallel with the bandage. The deflection thereby caused of pen 22 serves as relative measure for the deflections caused by the beats of the pulse to be tested.

The recording apparatus which indicates the oscillations is controlled by a manometer, and the form of these oscillations is determined by the difference in pressure between the space in the armband and the space in the interior of the casing. The variation in pressure of the recording apparatus in the course of a pulse cycle, and therefore the measure of oscillation on the oscillogram, does not show the pressure variations in the armband space, for during the relatively short period of a pulse cycle the pressure in the casing may be assumed as constant. However, the pressure variation in the interior of the bandage depends upon the amount of air and the volume of this space. Neglecting the variation in the amount of air during a pulse cycle, which is permissible in view of the constriction in the throttle valve between the space in the bandage and that in the casing, then the pressure variation in the bandage during the pulse cycle and therewith the extent of oscillation is dependent upon the variation in volume in the space of the bandage. Also the volume of the bandage varies in the same amount as the volume of blood in the part of the brachial artery which is covered by the bandage, in an inverse sense. In this consideration the additional volume changes of the texture of the arm such as the muscles have been overlooked. Therefore the result of the arrangement is that the extent of oscillation is a measure of the volume variation of the part of the brachial artery which is covered by the bandage.

The mechanism of the apparatus is protected from dust and injuries by a protection plate 39, Figure 3. This plate has an arcuate slot 41 through which passes the rod 40 that carries the recording pen 22, and two holes. Through the one of these holes passes the shaft 15 of dial 16 while through the other hole extends a rod 42 which is mounted on a two-armed swing lever 43 fulcrumed on the underside of plate 39. The short arm of this lever 43 is acted upon by a setting member such as an eccentric disc 44, Figures 3 and 6, mounted on the casing of cock 27, in such a manner, that the long arm of double lever 43 lifts the recording pen 22 when the apparatus is at rest and lowers it onto the diagram sheet on dial 16 in accordance with the motion of inlet cock 27 only when the record of the beats begins.

The air-tight closure of casing 6 by cover 5 may be established in different manner. As to be seen from Figures 1 and 2, to this end several clamping screws are provided. Other suitable tightening means are illustrated in Figures 8 and 9. In this modification a packing ring $a$, e. g. of rubber, is lodged in an annular groove of casing 6. The cover 5 on which is mounted a glass plate $b$ has likewise an annular groove in which is lodged a ring $c$ that can be shifted in circumferential direction. This ring is covered by another ring $5a$ fixed on cover 5 by means of screws $d$. Cover 5 and ring $c$ possess recesses $e$, Figure 9, which correspond to prongs $f$ mounted on casing 6. As illustrated in Figure 9, one of these prongs may be combined with a hinge $g$ for the cover 5. The cover 5 further possesses a recess $h$, Figure 9, wherein is rotatably mounted a pinion $i$ in mesh with a series of internal teeth $k$ of ring $c$. The shaft of pinion $i$ passes through the ring $5a$ and may be provided on its outer end with a suitable handle $m$, as indicated in dot and dash lines in Figure 9, so that ring $c$ can be turned from outside without any special tool. Either the prongs $f$ or the portions adjacent to the recesses $e$, of ring $c$ are provided with wedge faces. The described cover is so put on the packing ring $a$ of casing 6 that the prongs $f$ pass through the recesses of portions 5 and $c$, whereupon pinion $i$ is turned so that ring $c$ is shifted in the one or other direction and the prongs $f$ engage ring $c$ and depress the packing ring $a$, whereby an air-tight obturation of casing 6 is obtained.

The glass plate $b$ through which the records made on the diagram sheet can be observed, rests on an annular offset of cover 5 and is held in place by ring $5a$ between an upper and lower packing ring $n$, so that this connection is air-tight too.

I claim:—

1. An oscillograph of the type described including an air-tight casing, two differential pressure responsive members within said casing, a diagram dial connected to one of said members, and a recording marker connected to the other of said members.

2. An oscillograph of the type described including an air-tight casing, two differential responsive members within said casing, a diagram dial connected to one of said members, a recording marker connected to the other of said members, a passage freely connecting the interior of the pressure responsive member connected to said diagram dial with the outside air, and a capillary passage connecting the interior of the other of said pressure responsive members with the interior of the casing.

3. An oscillograph of the type described including an air-tight casing, two differential pressure responsive members within said casing, a diagram dial connected to one of said members, a recording marker connected to the other of said members, said recording marker being adapted to contact with said diagram dial, means for holding said recording marker out of contact with said diagram dial, means for controlling said oscillograph, said means being operable to cause the oscillograph to begin a record, and means responsive to said operation to cause the marker to be brought into contact with said diagram dial.

4. An oscillograph of the type described including an air-tight casing, two differential responsive members within said casing, a diagram dial connected to one of said pressure responsive members, a recording marker connected to the other of said pressure responsive members, means for creating a pressure in said casing, means for relieving said pressure, each of said pressure responsive members actuating the member connected to it in accordance with the difference between the pressure in the casing and the pressure in the interior of the respective pressure responsive member, means for gradually equalizing the pressure in the interior of the pressure responsive member connected to said recording marker with the pressure in the casing, the interior of the other of said pressure responsive members being subjected to a substantially constant pressure.

5. An oscillograph of the type described including an air-tight casing, two differential pressure responsive members within said casing, a diagram dial connected to one of said pressure responsive members, a recording marker connected with the other of said pressure responsive members, means for creating a pressure in said casing, means for relieving said pressure, finely adjustable means controlling said pressure relieving means, each of said pressure responsive members actuating the member connected to it in accordance with the difference between the pressure in the casing and the pressure in the interior of the respective pressure responsive member, means for gradually equalizing the pressure in the interior of the pressure responsive member connected to said recording marker with the pressure in the casing, the interior of the other of said pressure responsive members being subjected to a substantially constant pressure.

6. An oscillograph of the type described including an air-tight casing, two differential pressure responsive members, a diagram dial connected to one of said pressure responsive members, and a recording marker connected to the other of said pressure responsive members and cooperating with said diagram dial, each of said last four members being located within said air-tight casing, and a transparent window adjacent said diagram dial whereby the record on said dial may be observed.

7. An oscillograph of the type described including an air-tight casing, two differential responsive members within said casing, a diagram dial connected to one of said members, a recording marker connected to the other of said members, a passage freely connecting the interior of the pressure responsive member connected to said diagram dial with the outside air, means for creating a pressure in said casing, means for relieving said pressure, and an adjustable capillary passage connecting the interior of the other of said pressure responsive members with the interior of the casing.

The foregoing specification signed at Berlin this 11th day of June, 1929.

JOHANN PLESCH.